(12) United States Patent
Huh

(10) Patent No.: US 12,394,130 B2
(45) Date of Patent: Aug. 19, 2025

(54) SYSTEM FOR PROVIDING A METAVERSE-BASED VIRTUALIZED IMAGE AND METHOD THEREFOR

(71) Applicant: LG ELECTRONICS INC., Seoul (KR)

(72) Inventor: Jiyoung Huh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 595 days.

(21) Appl. No.: 17/715,497

(22) Filed: Apr. 7, 2022

(65) Prior Publication Data

US 2023/0196650 A1   Jun. 22, 2023

(30) Foreign Application Priority Data

Dec. 21, 2021   (WO) ................ PCT/KR2021/019460

(51) Int. Cl.
| | |
|---|---|
| *G06T 15/00* | (2011.01) |
| *G06T 1/00* | (2006.01) |
| *G06T 17/00* | (2006.01) |
| *G06V 20/50* | (2022.01) |
| *G06V 40/16* | (2022.01) |
| *H04N 7/18* | (2006.01) |

(52) U.S. Cl.
CPC ............ *G06T 15/00* (2013.01); *G06T 1/0007* (2013.01); *G06T 17/00* (2013.01); *G06V 20/50* (2022.01); *G06V 40/166* (2022.01); *G06V 40/172* (2022.01); *H04N 7/18* (2013.01); *G06T 2200/08* (2013.01); *G06T 2207/30201* (2013.01)

(58) Field of Classification Search
CPC ....... G06T 15/00; G06T 1/0007; G06T 17/00; G06T 2200/08; G06T 2207/30201; G06T 13/40; G06T 19/006; G06V 20/50; G06V 40/166; G06V 40/172; G06V 20/20; H04N 7/18; H04N 7/183
USPC ......................................................... 345/419
See application file for complete search history.

(56) References Cited

U.S. PATENT DOCUMENTS

| | | | |
|---|---|---|---|
| 9,836,484 B1 * | 12/2017 | Bialynicka-Birula | ...................... G06V 40/172 |
| 9,836,819 B1 * | 12/2017 | Donsbach | ............ G11B 27/031 |
| 10,372,991 B1 * | 8/2019 | Niemasik | ............ G11B 27/031 |
| 2006/0147094 A1 * | 7/2006 | Yoo | ...................... G06V 40/193 382/117 |

(Continued)

FOREIGN PATENT DOCUMENTS

| | | |
|---|---|---|
| JP | 2017152800 | 8/2017 |
| JP | 2020071851 | 5/2020 |

(Continued)

OTHER PUBLICATIONS

PCT International Application No. PCT/KR2021/019460, International Search Report and Written Opinion dated Sep. 13, 2022, 10 pages.

*Primary Examiner* — Sheree N Brown
(74) *Attorney, Agent, or Firm* — LEE, HONG, DEGERMAN, KANG & WAIMEY

(57) ABSTRACT

The present disclosure provides a method of providing a metaverse-based virtualized image, the method including capturing an image in real time via an IP camera, storing the captured image, recognizing at least one face and object from the captured image, virtualizing the recognized at least one face and object, and outputting a virtualized image information including a virtualized character and a virtual object.

12 Claims, 13 Drawing Sheets

(56) References Cited

U.S. PATENT DOCUMENTS

| | | | |
|---|---|---|---|
| 2007/0274519 A1* | 11/2007 | Cohen | H04N 21/4402 380/201 |
| 2012/0044347 A1* | 2/2012 | Sugio | H04N 23/69 348/240.99 |
| 2013/0266205 A1* | 10/2013 | Valpola | G06T 7/194 382/153 |
| 2017/0020476 A1* | 1/2017 | Hatakeyama | A61B 6/585 |
| 2018/0018508 A1 | 1/2018 | Tusch | |
| 2018/0196587 A1* | 7/2018 | Bialynicka-Birula | G06V 20/41 |
| 2018/0349703 A1* | 12/2018 | Rathod | A63F 13/65 |
| 2019/0297230 A1* | 9/2019 | Kitagawa | H04N 7/183 |
| 2020/0286284 A1* | 9/2020 | Grabli | G06T 13/40 |
| 2020/0349246 A1* | 11/2020 | Budman | G06N 20/00 |
| 2021/0383100 A1* | 12/2021 | Dahlkamp | G06F 21/602 |

FOREIGN PATENT DOCUMENTS

| | | |
|---|---|---|
| KR | 1020160012362 | 2/2016 |
| KR | 102123248 | 6/2020 |

* cited by examiner

FIG. 8
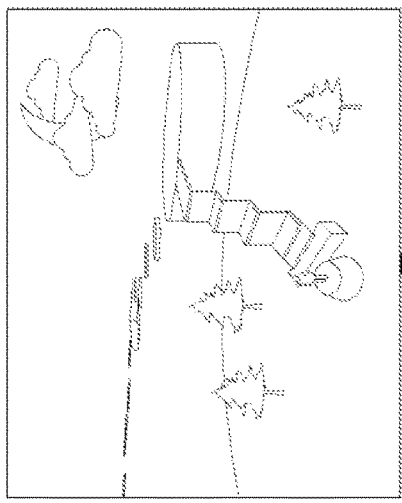
On-line meeting by inviting friends and family members
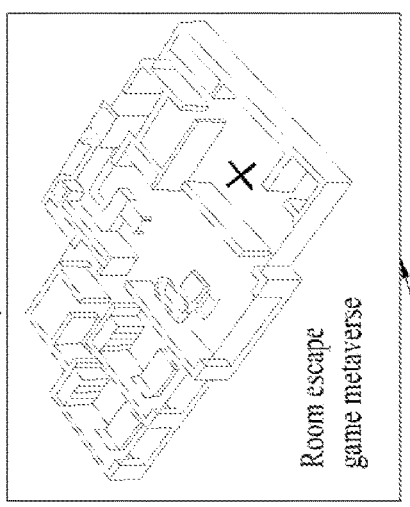
Room escape game metaverse
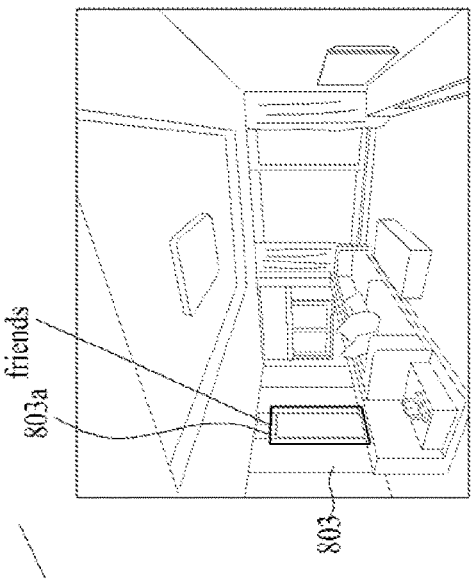
Extending a virtual space for me only in our house
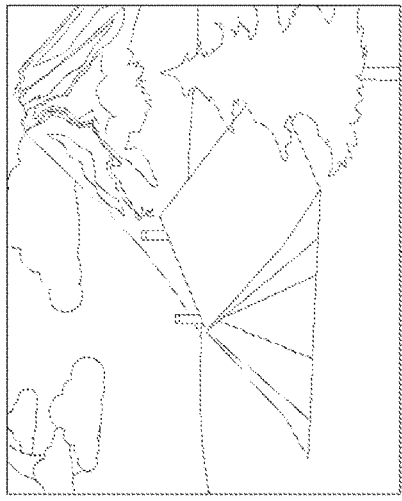
(a) Hana's Room
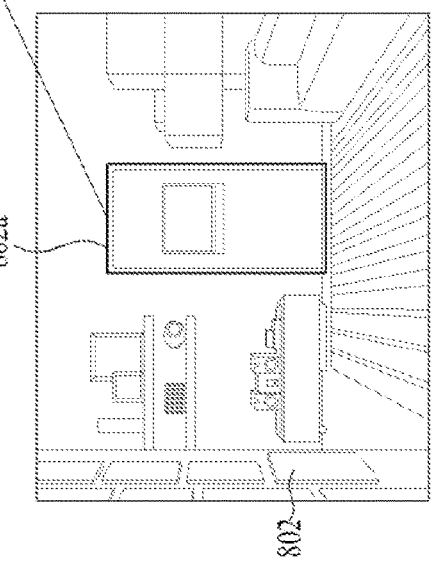
(b) Room of Hana's friend, Gina
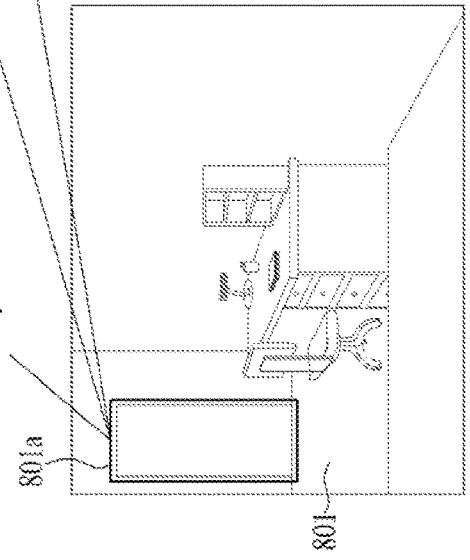
(c) Room of Hana's friend, Mina
Game with friends and family members
Various activities by making a virtual space with friends FIG. 10
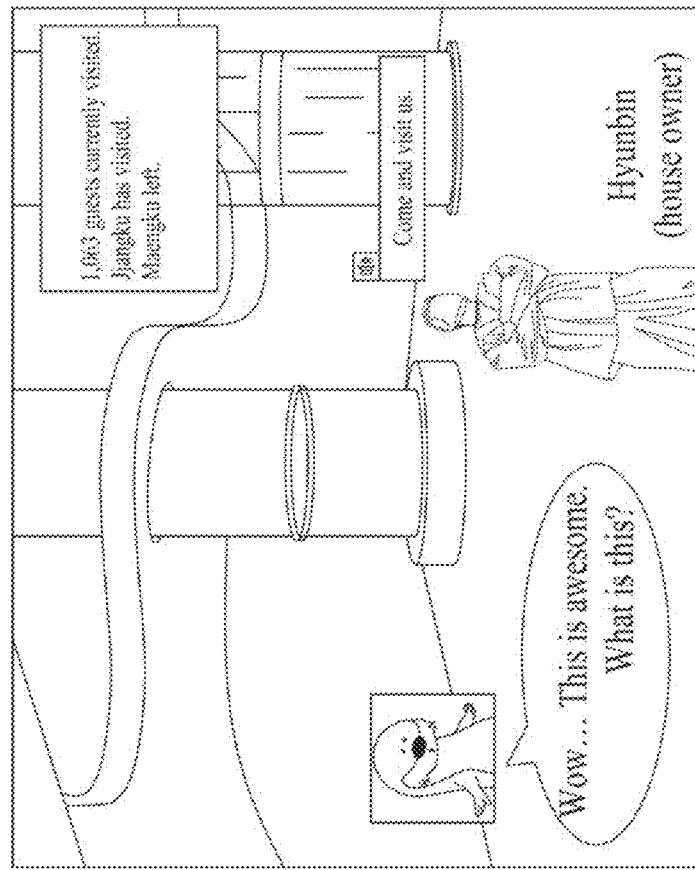
(b) Share our virtualized house and my virtualized appearance
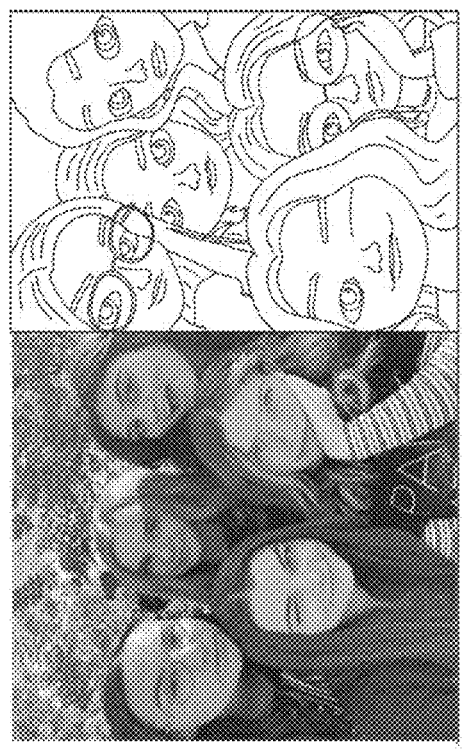
(a) Create metaverse character based on my face FIG. 11
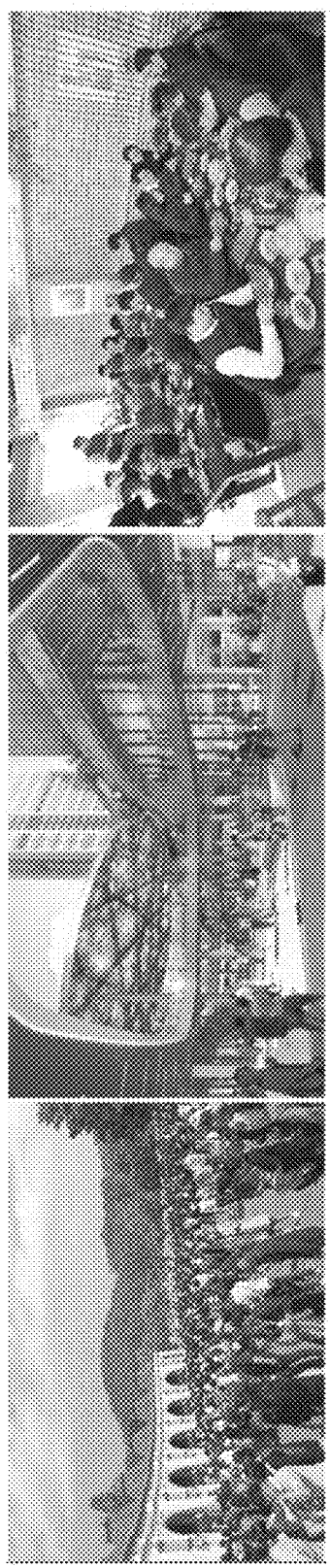
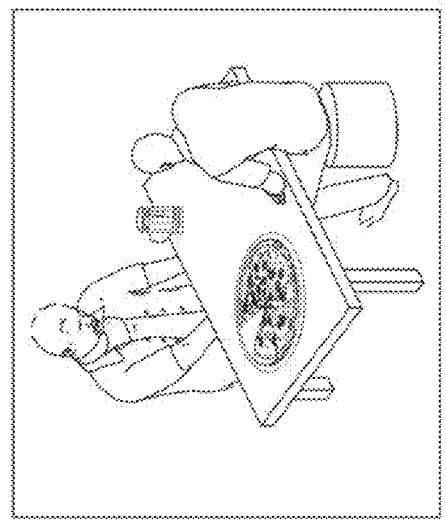
(a)
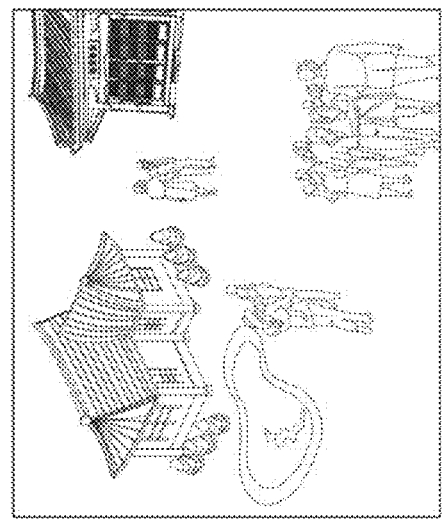
(b)

SYSTEM FOR PROVIDING A METAVERSE-BASED VIRTUALIZED IMAGE AND METHOD THEREFOR

CROSS REFERENCE TO RELATED APPLICATIONS

Pursuant to 35 U.S.C. § 119(a), this application claims the benefit of an earlier filing date and right of priority to International Application No. PCT/KR2021/019460, filed on Dec. 21, 2021, the contents of which are hereby incorporated by reference herein in its entirety.

BACKGROUND OF THE DISCLOSURE

Field of the Disclosure

The present disclosure relates to a system for providing a metaverse-based virtualized image and method therefor.

Discussion of the Related Art

Recently, virtual reality, augmented reality, and mixed reality technologies that apply computer graphics technology have been developed. At this time, virtual reality technology refers to a technology that uses a computer to build a virtual space that does not exist in the real world and makes it feel real, and augmented reality or mixed reality technology refers to a technology that expresses information generated by a computer over the real world, i.e., a technology that combines the real world and the virtual world together to enable interaction with a user in real time.

Among them, augmented reality and mixed reality technologies are used in combination with technologies in various fields (e.g., broadcasting technology, medical technology, and game technology). Typical examples of the use of augmented reality technology in the field of broadcasting technology includes a case that a weather map in front of a weather forecaster on TV changes naturally and a case that an advertisement image that does not exist in the stadium is inserted on the screen and broadcasted as if existing in the stadium actually. In particular, these augmented reality and mixed reality technologies have been implemented and provided as various application services with the advent of smartphones.

Metaverse is a representative service that provides augmented reality or mixed reality to users. Metaverse is a combination of 'meta', which means virtual, and 'universe', which means real world, and refers to a three-dimensional virtual world where social/economic/cultural activities take place like the real world. In metaverse, users create their own avatars, communicate with other users, and engage in economic activities, and thus everyday life can be implemented in the virtual world.

In addition, an Internet Protocol (IP) camera is a sort of a digital camera that is generally disposed for surveillance in general, and unlike analog Closed-Circuit Television (CCTV) cameras, corresponds to a camera that can receive data through computer networks and Internet. Most cameras that do such a job are web-cams, but the IP camera generally corresponds to only surveillance purposes, which can be accessed directly over a network connection.

However, when using an IP camera, data is transmitted and received through Internet, so there is always a problem of privacy invasion that when and how images taken by the IP camera will be released to the outside.

In the real situation where the number of single-person households, double-income households, and elderly households is increasing, it is expected that measures to solve the problem of privacy invasion and use IP cameras will be needed.

SUMMARY OF THE DISCLOSURE

Accordingly, embodiments of the present disclosure are directed to a system for providing a metaverse-based virtualized image and method therefor that substantially obviate one or more problems due to limitations and disadvantages of the related art.

One object of the present disclosure is to provide a system for providing a metaverse-based virtualized image and method therefor.

Objects obtainable from the present disclosure are non-limited by the above-mentioned object. And, other unmentioned technical objects can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of providing a metaverse-based virtualized image may include capturing an image in real time via an IP camera, storing the captured image, recognizing at least one face and object from the captured image, virtualizing the recognized at least one face and object, and outputting a virtualized image information including a virtualized character and a virtual object.

The recognizing the at least one face and object from the captured image may include requesting an analysis of the image by transmitting frame and sound information of the captured image to a cloud server based on a preset period and detecting a change of the recognized face and object.

The cloud server may recognize a face and object of the captured image based on an AI algorithm, and the AI algorithm may include at least one of object detection, color detection, face identification, object tracking, action detection, or sound analysis.

The virtualizing the recognized at least one face and object may further include 3D-modeling the recognized face into a character and 3D-modeling the object into a virtual object.

The method may include generating a virtualized image information including the character and the virtual object, and locations of the character and the virtual object in the virtualized image information are equal to locations of the recognized face and object in the captured image.

The method may further include saving a first virtualized image information including a first character and a first virtual object to the cloud server and sharing by the cloud server the first virtualized image information with a terminal.

The terminal may generate and output a metaverse image based on the virtualized image information and a virtualized image in the terminal.

The method may include detecting a preset situation and providing a notification if the preset situation is detected.

Based on detecting the preset situation, an original copy of the captured image may be saved to the cloud server.

The preset situation may include a case that at least one of an unregistered character or a virtual object is recognized from the virtualized image information, a case that a registered character is recognized from the virtualized image information, and a case that the registered character does not move over a preset time in the virtualized image information.

The method may further include receiving a second virtualized image information including a second virtual object from the cloud server, outputting the second virtualized image information, receiving a signal of selecting the second virtual object, searching for an object related to the second virtual object or an object similar to the second virtual object, and outputting the found object related to the second virtual object or the similar object.

The captured image may be stored in a memory within the IP camera.

The preset period may be determined based on at least one of the recognized face or the recognized object.

In another aspect of the present invention, as embodied and broadly described herein, a system for providing a metaverse-based virtualized image may include an IP camera capturing an image in real time, a cloud server configured to receive frame and sound information of the captured image, recognize at least one face and object from the captured image, virtualize the recognized at least one face and object, and generate a virtualized image information including the virtualized face and object, and a terminal configured to receive the virtualized image information from the cloud server and output the received virtualized image information, wherein the cloud server may recognizes the at least one face and object based on an AI algorithm.

The effects of a metaverse-based virtualized image providing method and system according to the present disclosure are described below.

According to at least one of embodiments of the present disclosure, there is an advantage in that privacy invasion anxiety may be eliminated when using a home CCTV.

According to at least one of embodiments of the present disclosure, there is an advantage in that emotional and fun elements may be extended through new virtual space creation and enjoyable interaction between family members.

According to at least one of embodiments of the present disclosure, new home appliances, furniture, and interior accessories are applied to a virtual space, thereby providing convenience of interior-related shopping.

Further scope of applicability of the present invention will become apparent from the detailed description given hereinafter.

However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIGS. 8 to 12 are diagrams illustrating schemes of utilizing virtualized image information according to one embodiment of the present disclosure.

DETAILED DESCRIPTION OF THE DISCLOSURE

Figure 1:
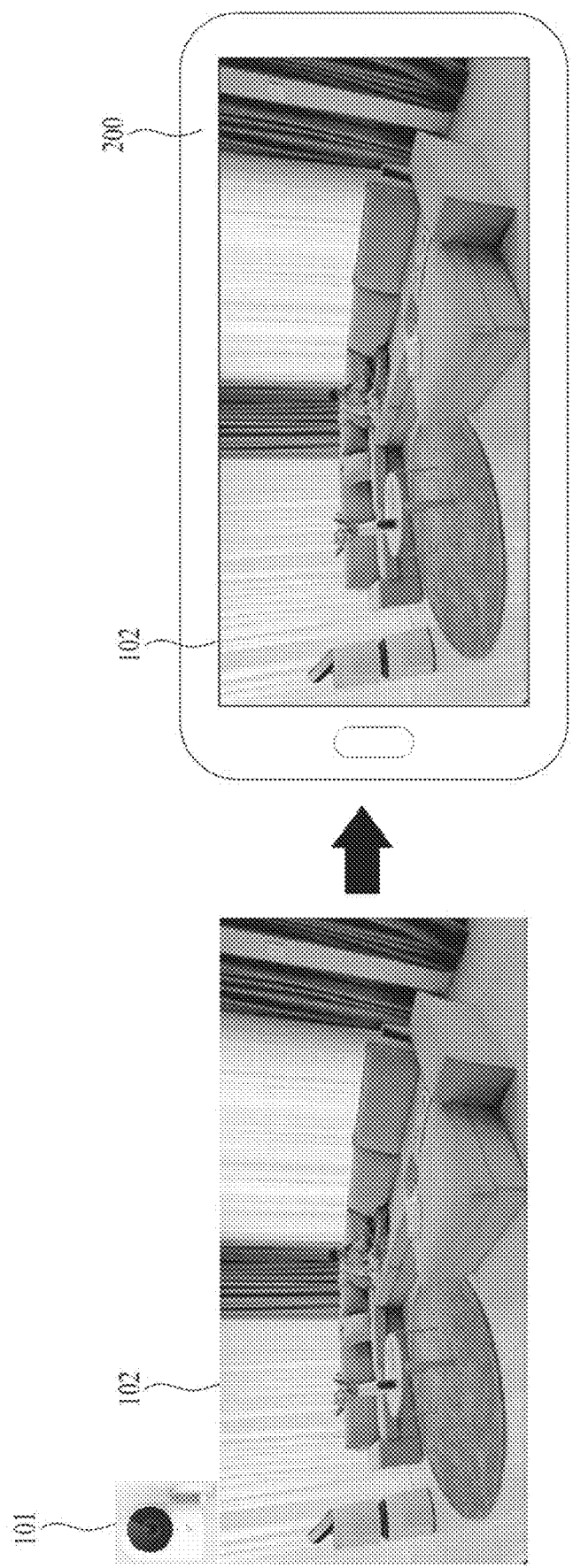
FIG. 1 is a diagram illustrating an embodiment of outputting an image captured by an IP camera of the related art.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In the present application, terms such as "include" or "has" are used herein and should be understood that they are intended to indicate an existence of several components, functions or steps, disclosed in the specification, and it is also understood that greater or fewer components, functions, or steps may likewise be utilized.

With the increase in double-income families, needs for the use of CCTVs to monitor the conditions of children, pets, or elderly parents are steadily increasing. Regarding an IP camera mainly used for a CCTV, an image is taken with an IP camera, the taken image is stored in a cloud server, etc., and both real-time and stored images of the IP camera can be checked with applications. However, there is still a risk of use due to privacy invasion between family members and IP camera hacking issue.

In addition, by analyzing an images from an IP camera, it is difficult to alarm with good performance. If sound or motion is detected, an alarm is given, but there is also a problem that alarms are generated too frequently but an important alarm is not given.

In particular, what a user wants to know through CCTV is whether a child went to kindergarten or academy on time, whether a stranger came home, whether parents are active enough, or what a pet is doing, which is the purposes of the CCCTV, but the user doesn't have to see a real house and real family members' faces.

Accordingly, the present disclosure intends to provide a method of virtualizing and displaying a CCTV image instead of an actual image. That is, an image may be captured through an IP camera and an original image may be stored in a memory of the IP camera. More specifically, in an embodiment of the present disclosure, an indoor metaverse environment may be constructed using face, motion, and object recognition technology, and a family member may be 3D modeled as a character. This will be described in detail with reference to the accompanying drawings.

FIG. 1 is a diagram illustrating an embodiment of outputting an image captured by an IP camera of the related art.

Referring to FIG. 1, an IP camera 101 may capture an image 102 in real time. In doing so, the image 102 captured by the IP camera 101 may be externally transmitted via a network. For example, a terminal 200 may receive the image 102 captured by the IP camera 101 and output it through a display.

In this case, when the image 102 captured by the IP camera 101 is directly transmitted to the terminal from the IP camera 101 via the network, there may be a risk that the captured image 102 may remain in the network. Namely, That is, in the case of the IP camera 101, it is common to be installed in the home for monitoring purposes, but since an image in the home is transmitted through the network to be transmitted to the terminal 200, there is a risk of hacking, which may lead to privacy invasion. In order to compensate for this point, an embodiment of the present disclosure proposes a method of virtualizing a face and an object recognized from the image 102 captured by the IP camera 101 and providing the same to the terminal 200.

Figure 2:
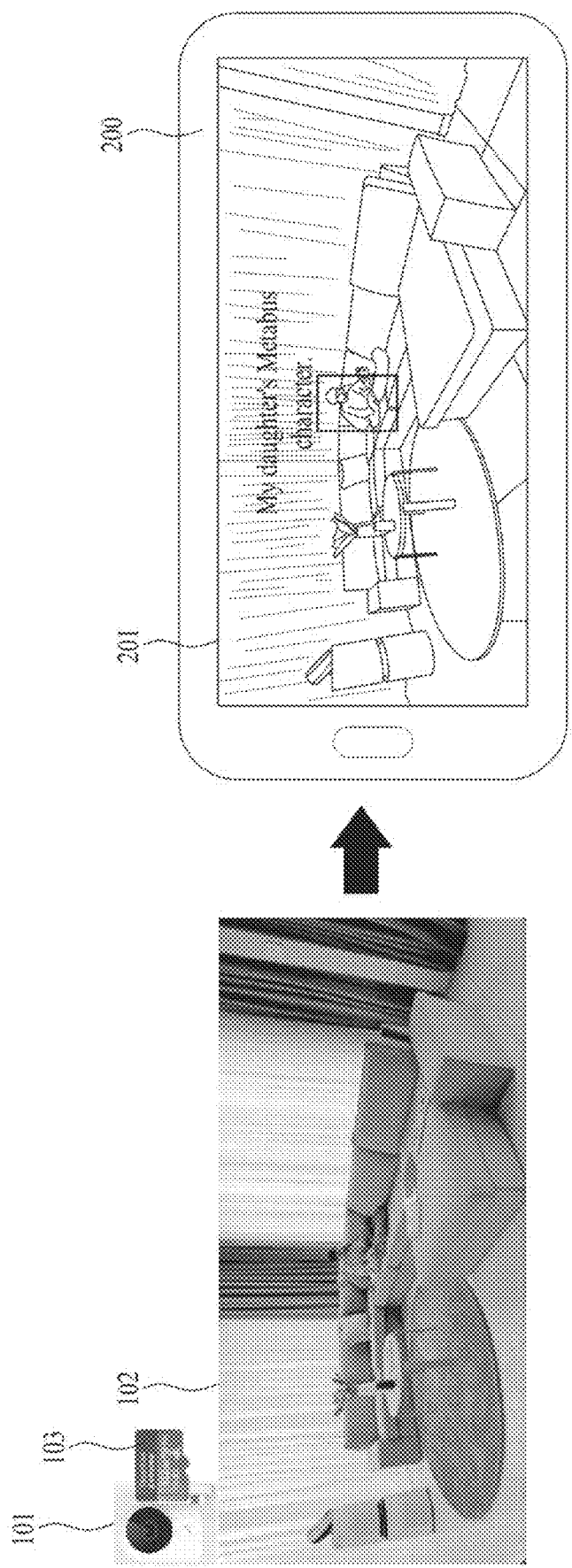
FIG. 2 is a diagram illustrating an example of outputting an image captured by an IP camera according to one embodiment of the present disclosure.

FIG. 2 is a diagram illustrating an example of outputting an image captured by an IP camera according to one embodiment of the present disclosure.

Referring to FIG. 2, an IP camera 101 may capture an image 102 in real time. In this case, the captured image 102 may be stored in a memory 103 of the IP camera 101. Here, the memory 103 may include an SD card and the like.

In one embodiment of the present disclosure, the captured image 102 may be transmitted and virtualized via a cloud server. Thereafter, having received the virtualized image 201 via the cloud server, a terminal 200 may output the virtualized image 201. In this case, the terminal 200 may correspond to a metaverse client terminal configured to provide metaverse based information. The terminal 200 may include one of a mobile phone, a projector, a smartphone, a notebook computer (e.g., a laptop computer), a digital broadcast terminal, Personal Digital Assistants (PDA), Portable Multimedia Player (PMP), a navigation device, a slate PC, a tablet PC, an ultrabook, a wearable device (e.g., a watch-type terminal (smartwatch), a glasses-type terminal (smart glasses), a head mounted display (HMD)), etc.

Hereinafter, how the cloud server stores the captured image 102 and how the terminal 200 outputs the virtualized image 201 will be described in detail. This will be described in detail with reference to FIG. 3 and FIG. 4.

Accordingly, since an original copy of the captured image 102 is stored in the memory 103 of the IP camera 101 and the image 201 virtualized via the cloud server is outputted from the terminal 200, privacy can be protected.

Figure 3:
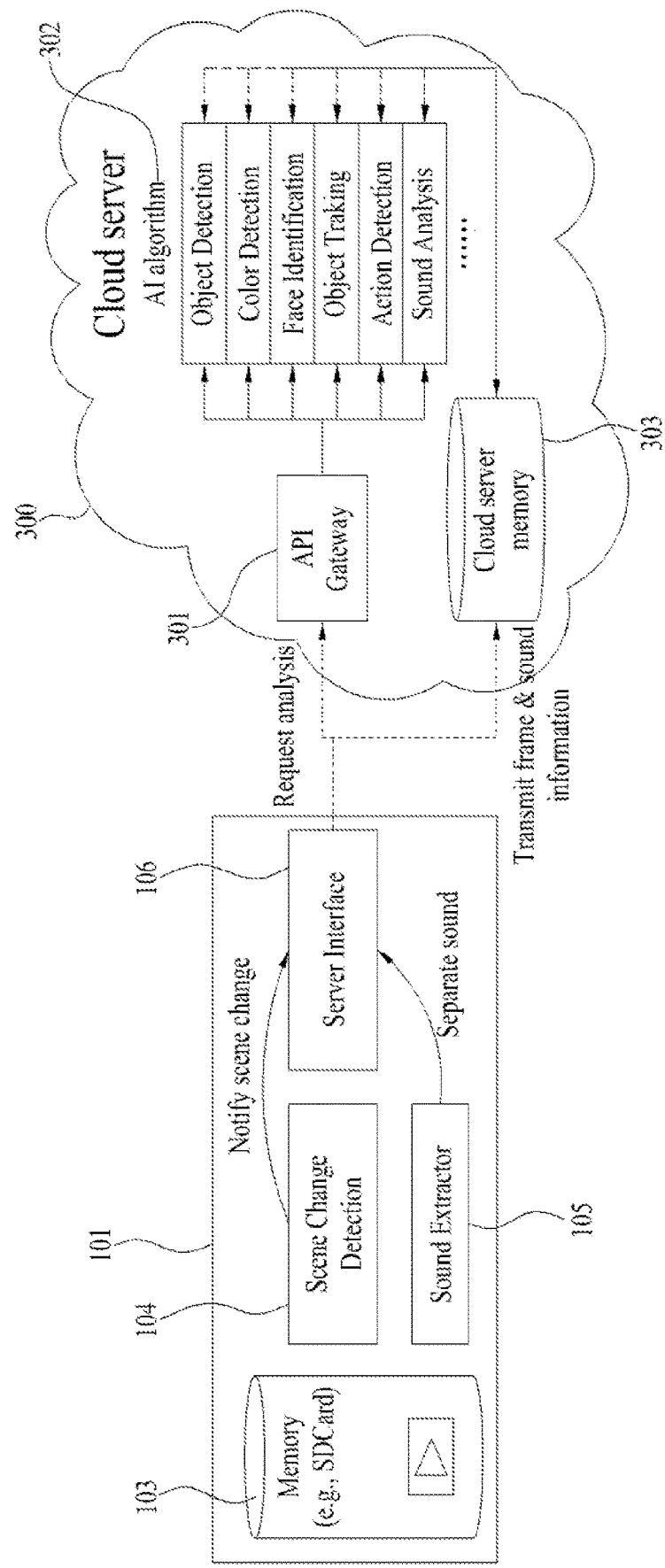
FIG. 3 is a diagram illustrating operations of an IP camera and a cloud server according to one embodiment of the present disclosure.

FIG. 3 is a diagram illustrating operations of an IP camera and a cloud server according to one embodiment of the present disclosure.

Referring to FIG. 3, an IP camera 101 may include a scene change detection 104, a sound extractor 105 and a server interface 106. In addition, a cloud server 300 may include an API gateway 301, an AI algorithm 302 and a cloud server memory 303. Since the components shown in FIG. 3 are not essential for implementation of the IP Camera 101 and the cloud server 300, the IP camera 101 and the cloud server 300 described in the present specification may have components more or less than the above-listed components. In addition, all of the aforementioned components are not shown in detail in the accompanying drawings, and only some important components may be shown in the accompanying drawings. However, although not all of them are shown, it is understandable to those skilled in the art that at least the components of FIG. 3 may be included in the IP camera 101 and the cloud server 300 to implement functions.

The IP camera 101 may capture an image in real time.

The memory 103 may store the image captured in real time by the IP camera 101. In this case, the memory 103 may be built in the IP camera 103 and may include an SD card. A user may then check the image stored in the memory 103.

The scene change detection 104 may extract frame information of the image captured by the IP camera 101. The scene change detection 104 may transmit the extracted frame information to the cloud server 300 via the server interface 106. The scene change detection 104 may detect a scene change of the image captured in real time by the IP camera 101. In doing so, the scene change detection 104 may directly detect a scene change or set up an alarm period of a scene change based on information (including period information for example) received from the cloud server 300 described later.

The sound extractor 105 may extract sound information of the image captured by the IP camera 101. The sound extractor 105 may transmit the extracted sound information to the cloud server 300 via the server interface 106.

The server interface 106 may transmit frame (e.g., 1 frame per 5 seconds) and sound information of the image captured by the IP camera 101 to the cloud server 300 and make a request for an analysis of the image.

The APIR gateway 301 may forward the request for the analysis of the frame information and the sound information received via the server interface 106 of the IP camera 101 to the AI algorithm 302 of the cloud server 300.

The AI algorithm 302 may perform at least one of object detection, color detection, face identification, object tracking, action detection and sound analysis on the received frame information and the received sound information. In this case, the above-described operation performed by the AI algorithm 302 is for a currently constructed algorithm, and more accurate information expression may be possible when other algorithms such as facial expression analysis and the like are added.

The AI algorithm 302 may store the results of object detection, color detection, face identification, object tracking, action detection, and sound analysis performed on the received frame information and sound information in the cloud server memory 303.

In addition, the cloud server 300 may save the frame information and sound information received from the IP camera 101 to the cloud server memory 303.

Figure 4:
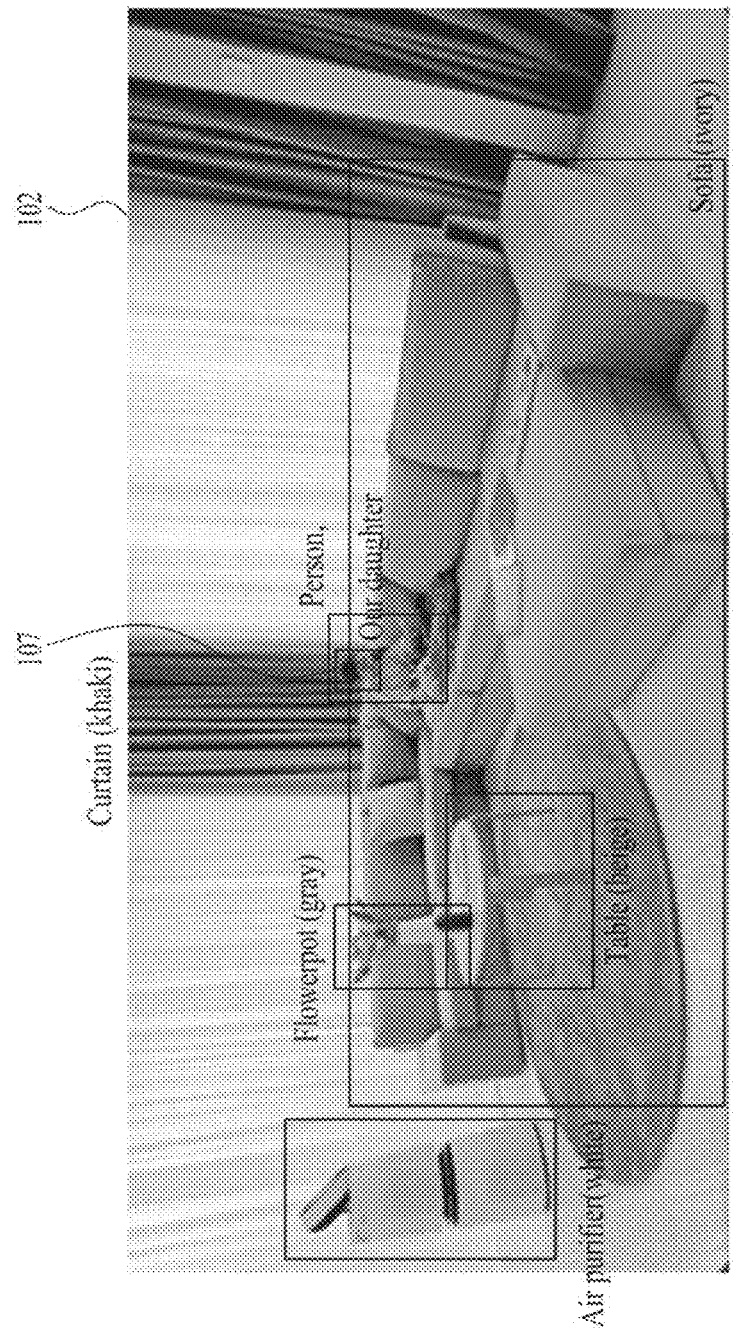
FIG. 4 is a diagram illustrating a result from analyzing an image through an AI algorithm of a cloud server according to one embodiment of the present disclosure.

FIG. 4 is a diagram illustrating a result from analyzing an image through an AI algorithm of a cloud server according to one embodiment of the present disclosure.

An image 102 captured via the aforementioned IP camera (not shown) may be analyzed as shown in FIG. 4.

Specifically, an AI algorithm in a cloud server may recognize at least one object in the image 102. In addition, if the recognized object is a person, the AI algorithm may recognize a face 107 of the person. In this case, if the face 107 corresponds to a registered user, the AI algorithm may identify the face 107 of the image 102. For example, the A algorithm may identify that the face 107 of the image 102 is 'our daughter'.

In addition, the AI algorithm may specifically recognize at least one object in the image 102. For example, the AI algorithm may identify a sofa, a table, a flowerpot, an air purifier, a curtain, and the like in the image 102.

In addition, the AI algorithm may recognize the color and arrangement of the recognized at least one object. For example, the AI algorithm may recognize the recognized object as ivory for the sofa, beige for the table, gray for the flowerpot, white for the air purifier, and khaki for the curtain. In addition, the AI algorithm may recognize a location, size, ratio and the like occupied by the recognized object in space.

Figure 5:
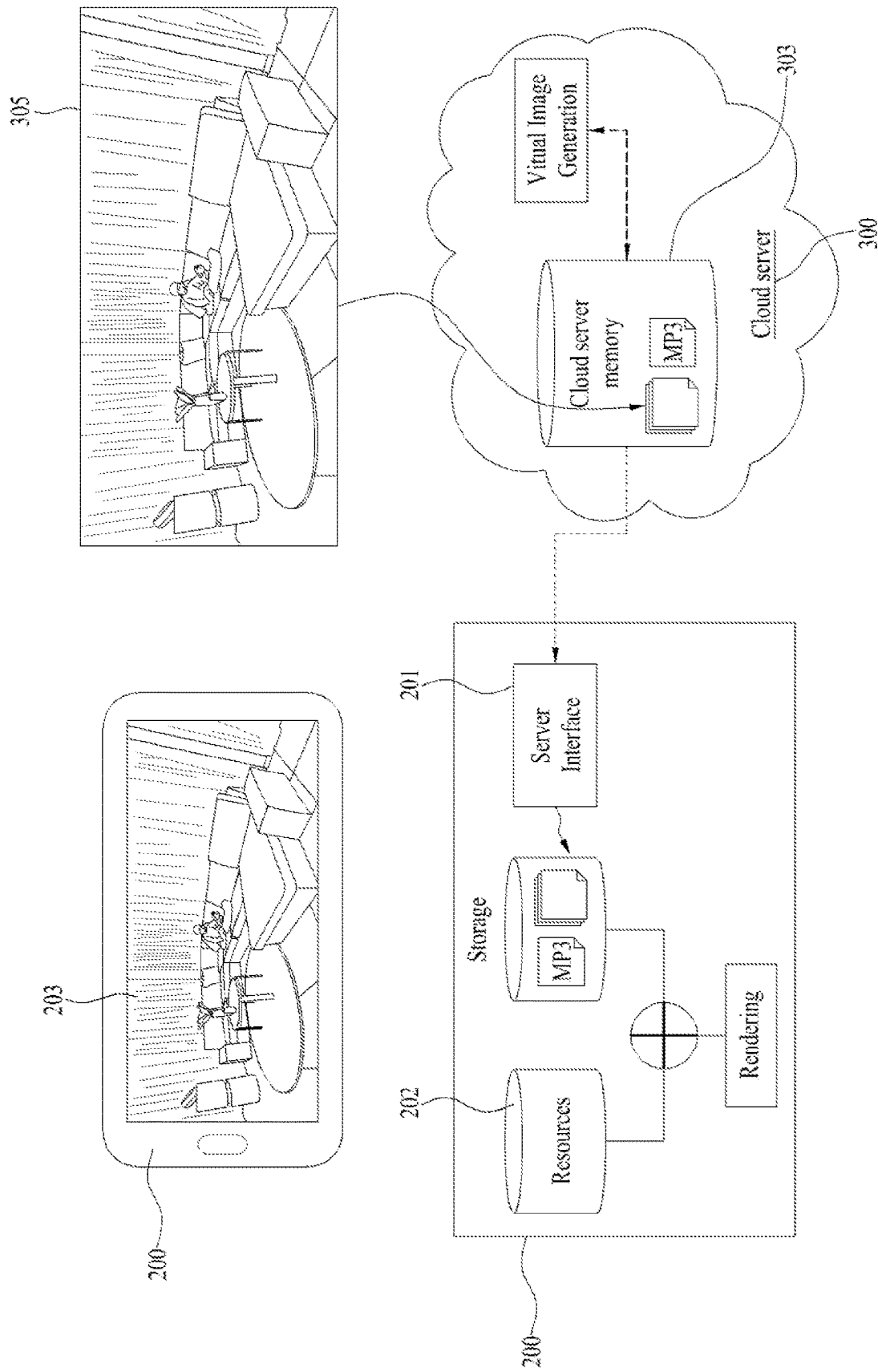
FIG. 5 is a diagram illustrating an example of virtualizing an image in a cloud server according to one embodiment of the present disclosure.

The recognized image information may be virtualized as shown in FIG. 5.

FIG. 5 is a diagram illustrating an example of virtualizing an image in a cloud server according to one embodiment of the present disclosure.

Referring to FIG. 5, a cloud server 300 may virtualize a captured image. Specifically, the cloud server 300 may perform virtualization to match a location and a color tone of an object based on image information analyzed like FIG. 4.

In one embodiment of the present disclosure, the cloud server 300 may 3D-model a recognized face as a character 304 and also 3D-model a recognized object as a virtual object. In this case, the character 304 may be a preconfigured metaverse character 304 or may correspond to a metaverse character 304 similar to the recognized face in case of absence of the preconfigured metaverse character 304.

In addition, the virtual object may correspond to a virtual object similar to the recognized object in size and color. The character 304 and the virtual object used herein may be extracted from the database stored in the cloud server 300.

As another embodiment, the character 304 and virtual object used herein may be extracted from another external resource usable in the cloud server 300.

In addition, when the cloud server 300 3D-models the recognized face as the character 304, it may precisely represent the character 304 using information such as action or face expression information and the like.

The cloud server 300 may generate virtualized image information 305 including the character 304 and the virtual object. In doing so, the cloud server 300 may generate the virtualized image information 305 in a manner of disposing locations and sizes of the 3D-modeled character 304 and the 3D-modeled virtual object to match the locations and sizes of an original image (i.e., raw data). Thereafter, the cloud server 300 may save the generated virtualized image information 305 to a cloud server memory 303.

In one embodiment of the present disclosure, a terminal 200 may receive (or read) the virtualized image information 305 and sound information from the cloud server 300. In addition, the sound information may be transmitted/received and stored in a manner of being included in or separated from the virtualized image information 305.

In one embodiment of the present disclosure, the terminal 200 may receive the virtualized image information 305 and sound information from the cloud server 300 via a server interface 201 of the terminal 200.

The terminal 200 may generate a metaverse image 203 using the received virtualized image information 305 and sound information and a virtualized image 202 in the terminal 200. In this case, the virtualized image 202 may include an image brought from an external server of the terminal 200 or correspond to an image stored in a resource within the terminal 200. Namely, the terminal 200 may receive only the virtualized image information 304 and sound information from the cloud server 300 and may render the virtualized image 202 stored in the resource. Thereafter, the terminal may output a metaverse image 203 through a display.

Accordingly, as the virtualization-processed character 304 and virtual object are stored in the cloud server 300, the problem of privacy invasion can be solved despite using the IP camera 101.

Figure 6:
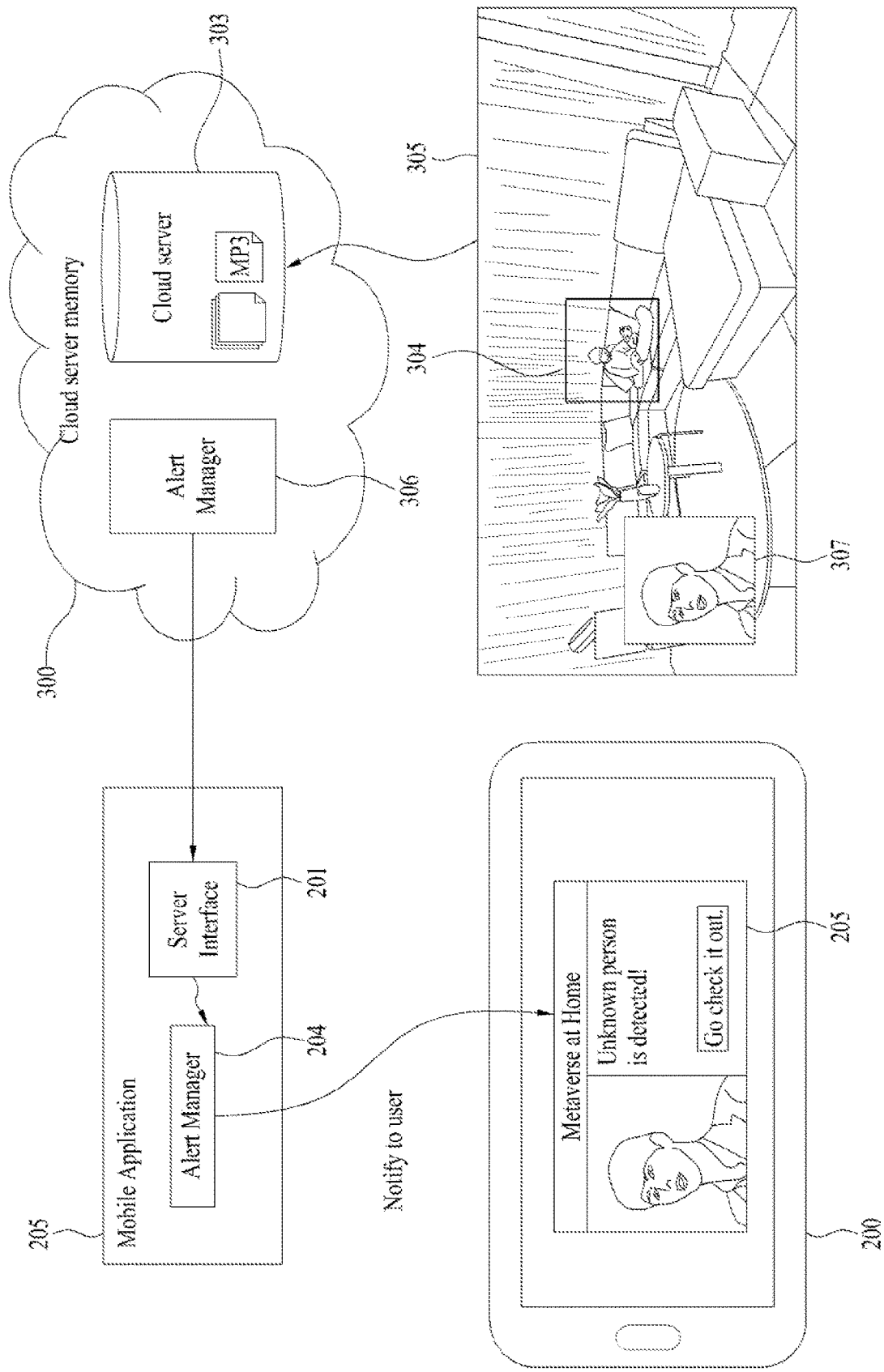
FIG. 6 is a diagram illustrating an example of detecting a preset situation and providing a notification to a terminal by a cloud server according to one embodiment of the present disclosure.

FIG. 6 is a diagram illustrating an example of detecting a preset situation and providing a notification to a terminal by a cloud server according to one embodiment of the present disclosure;

Referring to FIG. 6, a cloud server 300 may detect a preset situation based on virtualized image information 305 stored in a cloud server memory 303.

In one embodiment of the present disclosure, the cloud server 300 may provide a notification to a terminal 200 via an alert manager 306 in case of detecting a preset situation. Here, the preset situation may include a case that at least one of an unregistered character 307 or a virtual object is recognized from a virtualized image information 305, a case that a registered character 304 is recognized from the virtualized image information 305, or a case that the registered character 304 does not move over a preset time in the virtualized image information 305. For one example, the cloud server 300 may detect the case that the unregistered character 307 is recognized from the virtualized image information 305. For another example, the cloud server 300 may detect the case that t the registered character 304 does not move over a preset time in the virtualized image information 305. For further example, the preset situation may include an abnormal sound information (e.g., child crying sound), a fall (activity detection), etc.

In case of detecting the preset situation, the cloud server 300 may save an original copy of a captured image to a cloud server memory 303. In addition, in case of detecting the preset situation, the cloud server 300 may save the virtualized image information 305 and an original image (i.e., raw data) of the unregistered character 306 to the cloud server memory 303.

The terminal 200 may receive a notification from the cloud server 300 via a server interface 201. The terminal 200 may output the notification to a user via an alert manager 204 of the terminal 200. For example, the terminal 200 may output an original image (i.e., raw data) of the unregistered character 307 to a popup window 205 via a display. In doing so, the server interface 201, the alert manager 204, the popup window 205 and the like may operate in a metaverse related application 206 installed on the terminal 200.

In addition, the cloud server 300 may determine a preset situation in various ways if more AI algorithms are present in the cloud server 300. Namely, since the cloud server 300 determines a preset situation using an AI algorithm based on the captured image 102 and the virtualized image information 305, the cloud server 300 may determine a preset situation in more various ways if more AI algorithms are provided.

Through the above-described embodiment, a user normally checks the virtualized image information 305 via the terminal 200 only. If a preset situation occurs, the user may check an original image (raw data) of the unregistered character 307 via the terminal 200.

Through this, the user can usually be safe from the risk of privacy invasion or hacking, and can check the original image (raw data) in an emergency situation.

Figure 7:
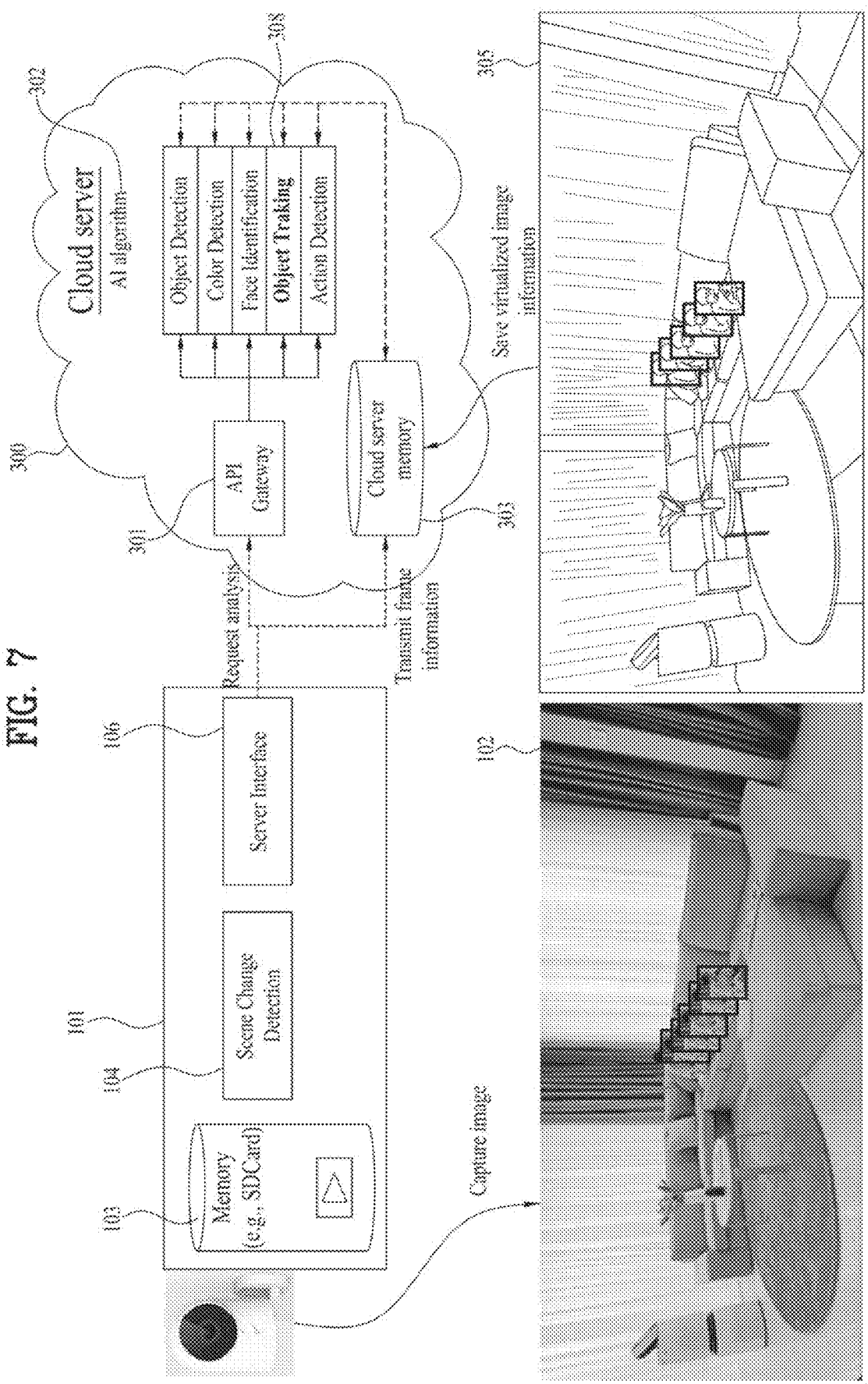
FIG. 7 is a diagram illustrating an example of performing object tracking in a cloud server according to one embodiment of the present disclosure.

FIG. 7 is a diagram illustrating an example of performing object tracking in a cloud server according to one embodiment of the present disclosure;

An IP camera 101 may make a request for an analysis of frame information of a captured image 102 via an API gateway 301 of a cloud server 300. In addition, the IP camera 101 may transmit the frame information of the captured image 102 to a cloud server memory 303.

The cloud server 300 may perform an object tracking 308 that is one of AI algorithms 302. Namely, the cloud server 300 may perform tracking on an object recognized from a virtualized image information 305 generated from virtualizing the captured image 102.

In one embodiment of the present disclosure, a preset period may be determined based on at least one of a recognized face and an object.

Specifically, if there is a moving object such as a person or an animal in the captured image 102, the IP camera 101 may set up a short analysis request period (e.g., 1 frame per second). If there is no moving object, the IP camera 101 may set up a long analysis request period (e.g., 1 frame per minute). Namely, the IP camera 101 may perform recognition of a simple object. If there are many motions of an object, the IP camera 101 may transmit frame information to the cloud server 300 more frequently and make a request for an image analysis.

The cloud server 300 may save the virtualized image information 305 on a moving object to the cloud server memory 303. Thereafter, the cloud server 303 may transmit the virtualized image information 305 to a terminal (not shown). Accordingly, the terminal may receive the virtualized image information 305 on which the object tracking has been performed. The terminal may output the virtualized image information 305 in which a character moves naturally.

FIGS. 8 to 12 are diagrams illustrating schemes of utilizing virtualized image information according to one embodiment of the present disclosure.

Through the above-described method, the image 102 captured via the IP camera 101 may be virtualized via the cloud server 300. The virtualized image information 305 is shared externally and may be outputted through the terminal 200. The virtualized image information 305 does not show an actual face or household objects as they are, and uses characters and virtual objects, so there is no concern about invasion of privacy even if they are disclosed externally. Accordingly, various embodiments in which the virtualized image information 305 may be used will be described with reference to FIGS. 8 to 12.

Referring to FIG. 8, in case of using a metaverse-based virtualized image providing system and method, a virtual door to another virtual space is included in the virtualized image information 305, whereby connection to another virtual space is available.

Specifically, FIG. 8(a) shows a first virtualized image information 801, FIG. 8(b) shows a second virtualized image information 802, and FIG. 8(c) shows a third virtualized image information 803. FIGS. 8(a) to 8(c) show embodiments of outputting virtualized image informations from first to third terminals, respectively. Here, the first to third terminals may correspond to terminals registered as friends with each other via the cloud server 300 or a metaverse related application. Alternatively, the first to third terminals may correspond to terminals having authentication keys capable of visiting virtualized image informations 801 to 803 to each other, respectively.

In this case, the first virtualized image information 801 may include a virtual door 801a connecting to a virtual space. Here, the virtual space may include a virtual space in which on-line meeting is available by inviting friends or family members, a game space capable of enjoying a game with friends or family members, and a virtual space capable of enjoying activities with friends or family members.

Accordingly, users may have meetings and games through virtual spaces without meeting each other actually. In addition, the users may use a virtual object virtualized based on an object actually captured via the IP camera 101. In addition, the virtual door 801a/802a/803a included in the virtualized image information 801/802/803 may correspond to an object connectible to another virtual space despite being a virtual object that does not exist actually. Users may have or enjoy a meeting, a game and the like in a new virtual space by being connected to the cloud server 300 via the virtual doors 801a, 802a and 803a.

Figure 9:
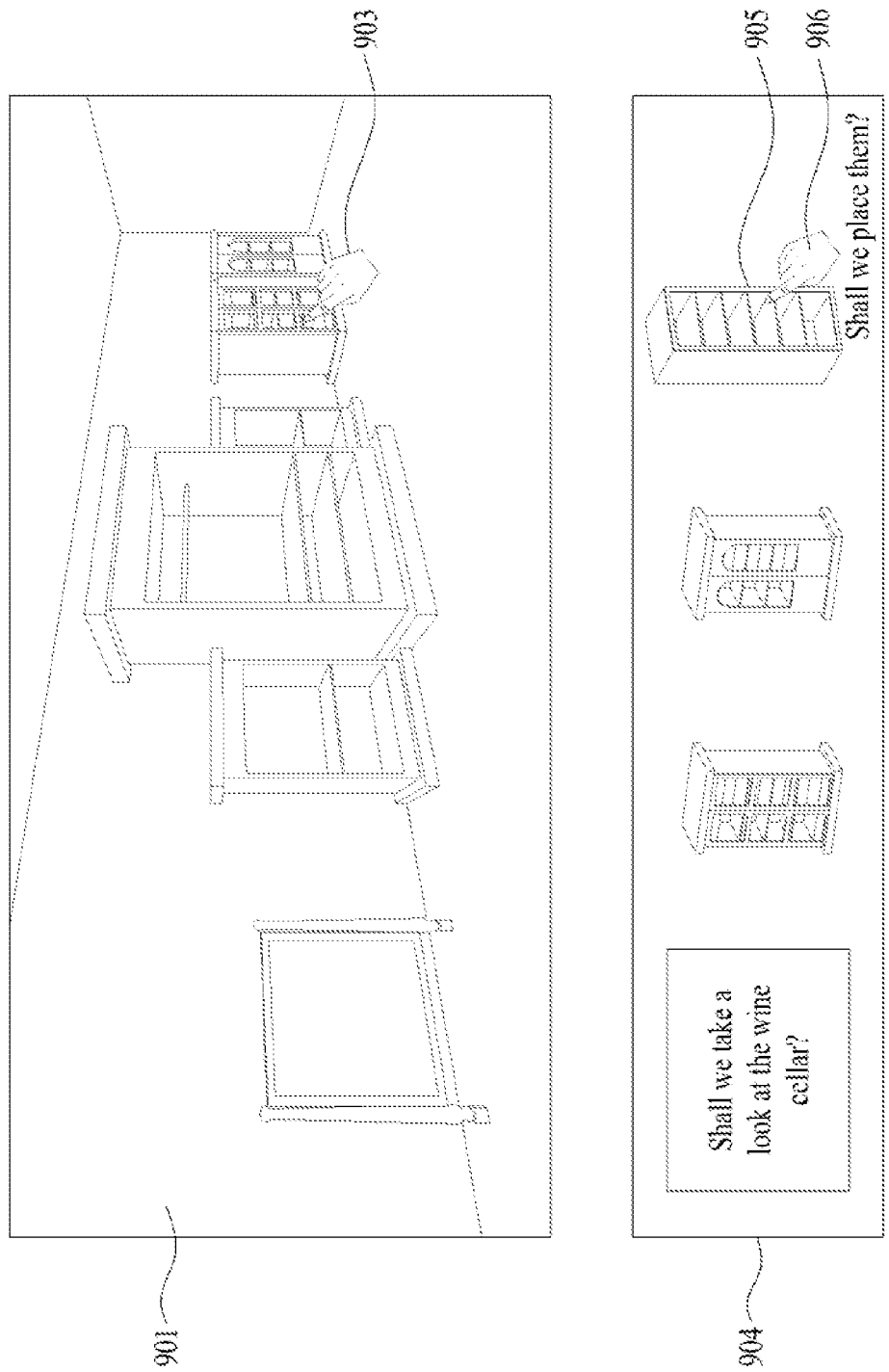

Referring to FIG. 9, the terminal 200 may output a virtualized image information 901. In this case, the virtualized image information 901 may correspond to a virtualized image information 901 on an image captured by a user of the terminal 200 or another user's virtualized image information 901 received via the cloud server 300.

In doing so, a signal 903 of selecting a virtual object 902 included in the virtualized image information 901 may be received. The terminal 200 may search for an actual object corresponding to the virtual object 902 or an actual object similar to the virtual object 902 via the cloud serve r 300. Thereafter, the terminal 200 may output a search result 904. Here, the search result 904 may include information on the actual object corresponding to the virtual object 902 or the actual object similar to the virtual object 902.

The terminal 200 may receive a signal 906 of selecting a first object 905 from the search result 904. Hence, the terminal 200 may place the first object 905 in the virtualized image information 901.

In addition, although FIG. 9 illustrates the embodiment of placing the first object 905 in the virtualized image information 901, an embodiment of purchasing the first object 905 according to the search result 904 may be taken into consideration as well. Likewise, as the terminal 200 receives the signal 906 of selecting the first object 905 from the search result 904, it may output a site at which the first object 905 can be purchased.

FIG. 10(*a*) illustrates an embodiment of creating a metaverse character based on an actual face, and FIG. 10(*b*) illustrates an embodiment of sharing a virtualized space and character.

As shown in FIG. 10(*a*), a metaverse character 1002 may be created based on an actually captured image 1001. A method of creating the metaverse character 1002 is as described above.

As shown in FIG. 10(*b*), a virtualized character and a virtual object may be shared with other persons. Namely, as described above, users may share the virtualized image information 305 including the virtual character and the virtual object via the cloud server 300. Through this, each user may place the virtual object in a virtualized space of its own, include sound information therein, and visit a virtualized space of another user. In addition, the cloud server 300 may provide the virtualized space with user information on a user visiting the virtualized space and output the user information through the terminal 200.

Namely, in case of using the metaverse-based virtualized image providing system and method, a platform of making a new influencer can be provided.

Through this, many influencers can share their own homes, which can create new advertising effects. For example, various types of advertising effects may occur, including virtualized home appliances, furniture, interior accessories, character clothes, and accessories. A method of purchasing such a virtual object is as described above with reference to FIG. 9.

When the metaverse-based virtualized image providing method according to one embodiment of the present disclosure is used, it is applicable not only to an indoor environment but also to an outdoor environment.

FIG. 11(*a*) is a diagram illustrating a general amusement park entrance line, a department store entrance line, and an interior of a restaurant, and FIG. 11(*b*) is a diagram illustrating them as the virtualization image information 305.

Namely, a user is unable to know an internal situation until the user actually goes to an amusement park, a department store, a restaurant, etc. Only after arriving, the user is able to know how many people are in the amusement park, the department store, or the restaurant. On the other hand, when the metaverse-based virtualized image providing method according to one embodiment of the present disclosure is used, the user may be informed of the situation in advance through the virtualized image information 305. More specifically, the IP cameras 101 are also recently used in amusement parks, department stores, and restaurants. In this case, the cloud server 300 may change the image 102 captured by the IP camera 101 installed in a public facility such as an amusement park, a department store, a restaurant, or the like into the virtualized image information 305. Since the faces of real people included in the captured image 102 have portrait rights, the amusement park, department store, restaurant, etc. cannot directly use the image 102. On the other hand, when the captured image 102 is changed into the virtualized image information 305 via the cloud server 300, the public facility may share the virtualized image information 305 externally.

Accordingly, if the IP camera 101 is installed in a desired place, a user may immediately determine the situation in the desired place through the virtualized image information 305 corresponding to the image 102 captured by the IP camera 101 without infringing on other people's portrait rights.

Figure 12:
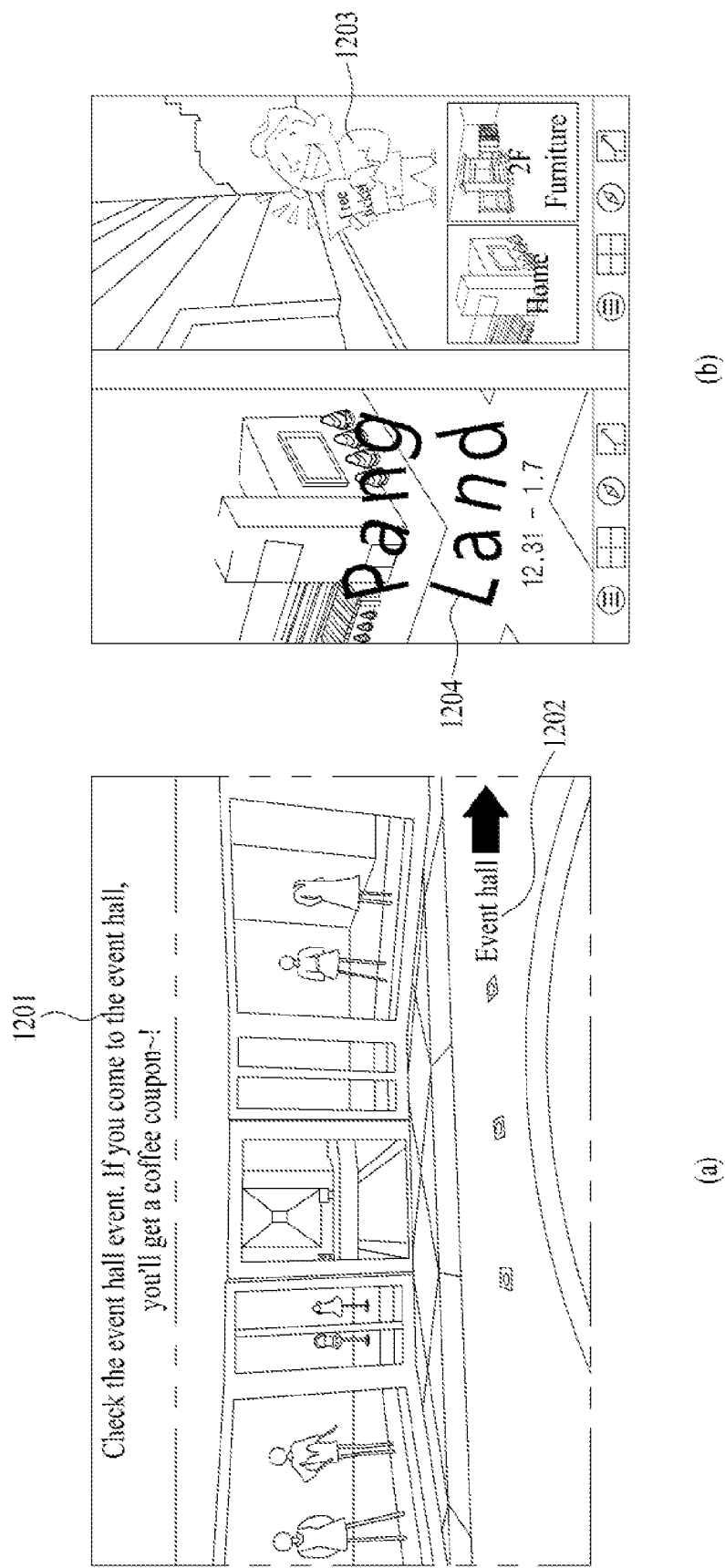

In addition, using the metaverse-based virtualized image providing method according to one embodiment of the present disclosure, it is able to provide a platform capable of providing event information and promotion or to link with various AR/VR games. In FIG. 12, a case of providing department store virtualized image information based on a department store in which an IP camera 101 is installed will be described as an example. Yet, this is only an example, and of course, it can be applied to every place where the IP camera 101 is installed.

FIG. 12(*a*) is a diagram of providing event information in department store virtualized image information, and FIG. 12(*b*) is a diagram of providing promotion information in department store virtualized image information. A user may output department store virtualized image information through the terminal 200.

As shown in FIG. 12(*a*), a department store virtualization image information may include an event information 1201. In addition, the department store virtualized image information may include a place indicator 1202 for guiding the event information 1201.

As shown in FIG. 12(*b*), a department store virtualized image information may include a promotion information 1203. When receiving a signal (not shown) of selecting the promotion information 1203, the terminal 200 may make a request for a subsequent operation to the cloud server 300. The terminal 200 may output a location information of the promotion information 1203 or a specific schedule information 1204 of the promotion information 1203 based on the instruction of the cloud server 300.

Figure 13:
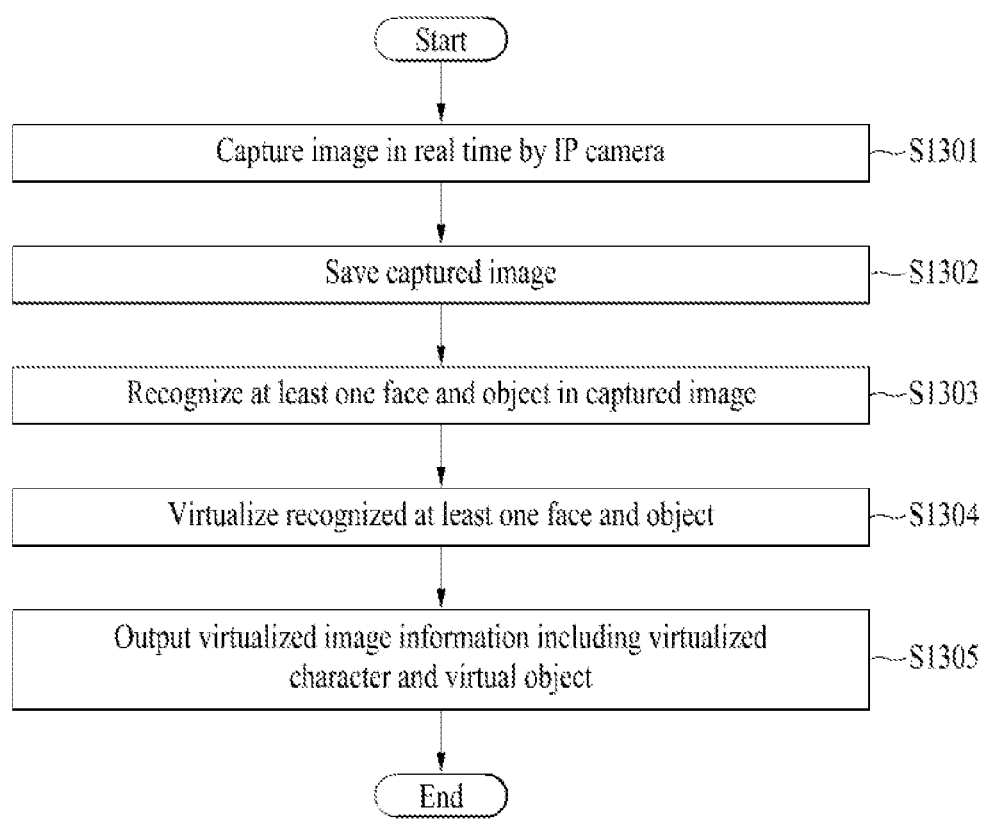
FIG. 13 is a flowchart illustrating a method of providing a metaverse-based virtualized image according to one embodiment of the present disclosure.

FIG. 13 is a flowchart illustrating a method of providing a metaverse-based virtualized image according to one embodiment of the present disclosure.

Referring to FIG. 13, in a step S1301, an image may be captured in real time via an IP camera.

In a step S1302, the captured image may be saved. In this case, the captured image may be saved to a memory in the IP camera.

In a step S1303, at least one face and object may be recognized from the captured image. In this case, after at least one object has been detected, if the detected object is a person or animal, a face may be detected.

In addition, in the step S1303, the IP camera may make a request for an analysis of an image by transmitting frame and sound information of the captured image to a cloud server based on a preset period. In this case, the preset period may be determined based on at least one of the recognized face and the recognized object.

The cloud server may detect a change of the recognized face and object in the captured image. In doing so, the cloud server may recognize a face and object of the captured image using an AI algorithm. Here, the AI algorithm may include at least one of object detection, color detection, face identification, object tracking, action detection and sound analysis.

In a step S1304, the recognized at least one face and object may be virtualized. In the step S1304, the recognized face can be 3D-modeled into a character. In addition, the recognized object may be 3D-modeled into a virtual object.

In the step S1304, a virtualized image information including the character and the virtual object may be generated. In this case, locations of the character and virtual object in the virtualized image information may be equal to those of the recognized face and object in the captured image. The cloud server may save the generated virtualized image information to a cloud server memory. Thereafter, the cloud server may share the saved virtualized image information with the terminal.

In a step S1305, the virtualized image information including the virtualized character and the virtual object may be outputted. Specifically, the terminal may generate and output a metaverse image using the virtualized image information received from the cloud server and the virtualized image in the terminal.

In addition, it is a matter of course that the embodiments through FIGS. 2 to 12 may be implemented by the method as shown in FIG. 13.

The present disclosure mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the image editing device. The foregoing embodiments are merely exemplary and are not to be considered as limiting the present disclosure. The present teachings can be readily applied to other types of methods and apparatuses. Thus, it is intended that the present disclosure covers the modifications and variations of this invention that come within the scope of the appended claims and their equivalents.

What is claimed is:

1. A method of providing a metaverse-based virtualized image, the method comprising:
    capturing an image in real time via an internet protocol (IP) camera;
    storing the captured image;
    recognizing a face and an object from the captured image;
    generating a virtual character and a virtual object corresponding to a virtualization of the recognized face and the object, respectively, based on the captured image; and
    outputting a virtualized image information including the virtualized character and the virtual object,
    wherein recognizing the face and the object from the captured image comprises:
    requesting an analysis of the captured image by transmitting frame and sound information of the captured image to a cloud server at a preset interval period; and
    detecting a change of the recognized face and object,
    wherein a length of the preset interval period is set to be shorter in a case in which motion of at least one of the recognized face or the recognized object is detected compared to a longer length in a case in which no motion is detected.

2. The method of claim 1, wherein the face and the object of the captured image are recognized by the cloud server based on an artificial intelligence (AI) algorithm, and wherein the AI algorithm includes at least one of object detection, color detection, face identification, object tracking, action detection, or sound analysis.

3. The method of claim 2, wherein the virtual character and virtual object are generated by 3D-modeling the recognized face and 3D-modeling the recognized object.

4. The method of claim 3, wherein locations of the virtual character and the virtual object in the virtualized image information respectively correspond to locations of the recognized face and recognized object in the captured image.

5. The method of claim 4, further comprising saving the virtualized image information to the cloud server, wherein the virtualized image information is shared with a terminal by the cloud server.

6. The method of claim 5, wherein a metaverse image is generated and output by the terminal based on the virtualized image information and a virtualized image stored in the terminal.

7. The method of claim 6, further comprising:
    detecting a preset situation; and
    providing a notification based on detection of the preset situation.

8. The method of claim 7, wherein based on detection of the preset situation, an original copy of the captured image is saved to the cloud server.

9. The method of claim 8, wherein the preset situation includes:
    wherein at least one of an unregistered character or a virtual object is recognized from the virtualized image information,
    wherein a registered character is recognized from the virtualized image information, or
    wherein the registered character does not move during a preset time based on the virtualized image information.

10. The method of claim 9, further comprising:
    receiving a second virtualized image information including a second virtual object from the cloud server;
    outputting the second virtualized image information;
    receiving a signal of selecting the second virtual object;
    searching for an object related or similar to the second virtual object; and
    outputting the object resulting from the search.

11. The method of claim 1, wherein the captured image is stored in a memory of the IP camera.

12. A system for providing a metaverse-based virtualized image, the system comprising:
    an IP camera configured to capture an image;
    a cloud server configured to: receive frame and sound information of the captured image, recognize a face and an object from the captured image based on an AI algorithm, generate a virtual character and a virtual object corresponding to a virtualization of the recognized face and the object, respectively, based on the captured image; and
    a terminal configured to receive virtualized image information from the cloud server and output the received virtualized image information,
    wherein the terminal is further configured to:
    request an analysis of the captured image by transmitting frame and sound information of the captured image to a cloud server at a preset interval period; and
    detect a change of the recognized face and object,
    wherein a length of the preset interval period is set to be shorter in a case in which motion of at least one of the recognized face or the recognized object is detected compared to a longer length in a case in which no motion is detected.

* * * * *